Feb. 1, 1966  G. WRIGHT  3,233,235
SIGNALING LEVEL
Filed Aug. 16, 1963  2 Sheets-Sheet 1
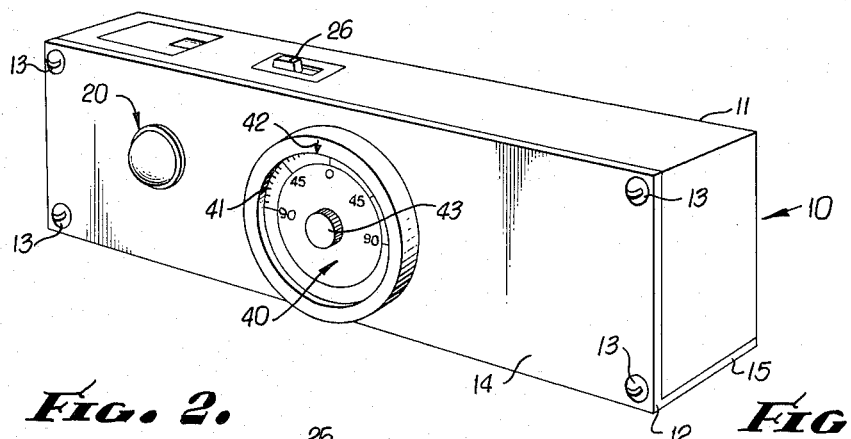
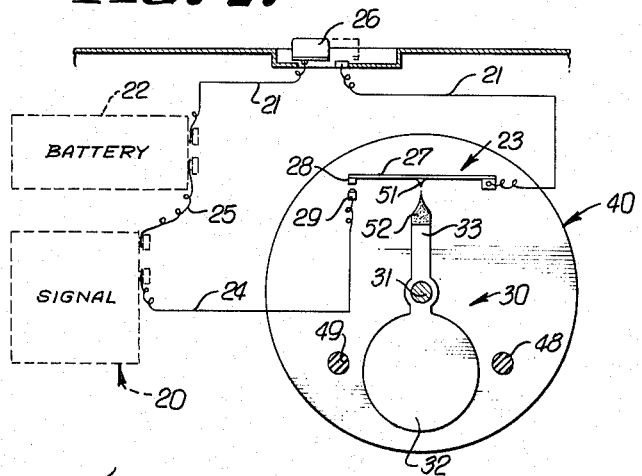
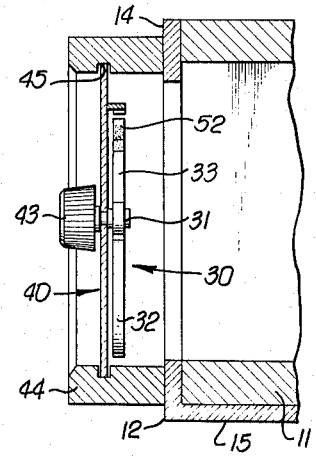
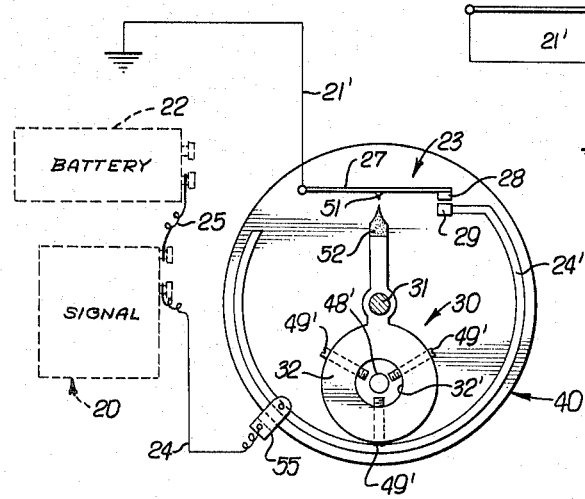
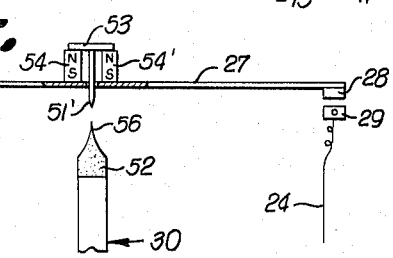
GILBERT WRIGHT
INVENTOR.
BY Miketta & Glenny
ATTORNEYS Feb. 1, 1966 G. WRIGHT 3,233,235
SIGNALING LEVEL
Filed Aug. 16, 1963 2 Sheets-Sheet 2
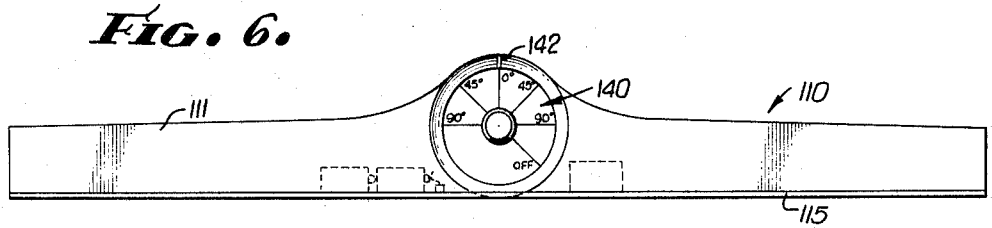
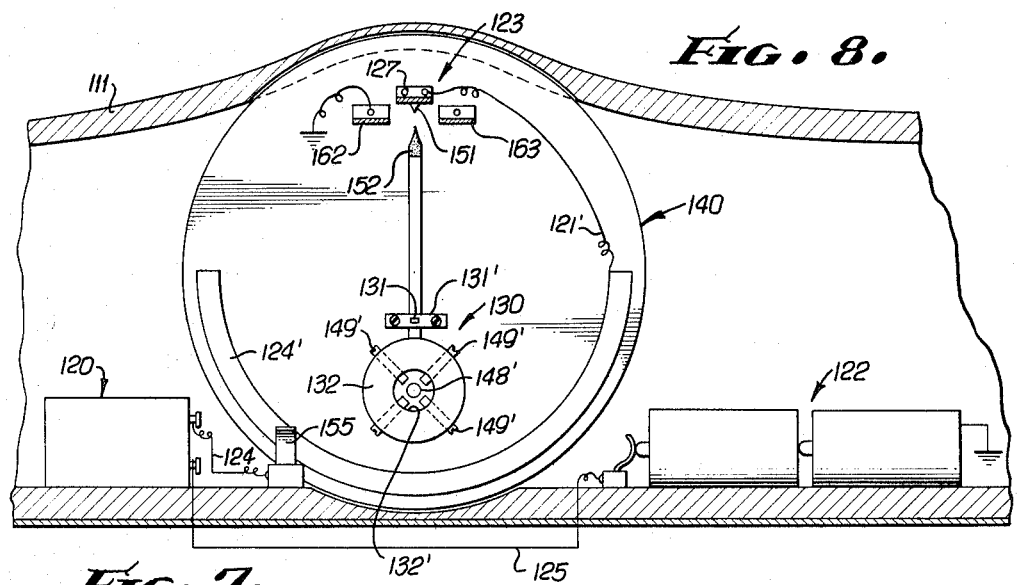
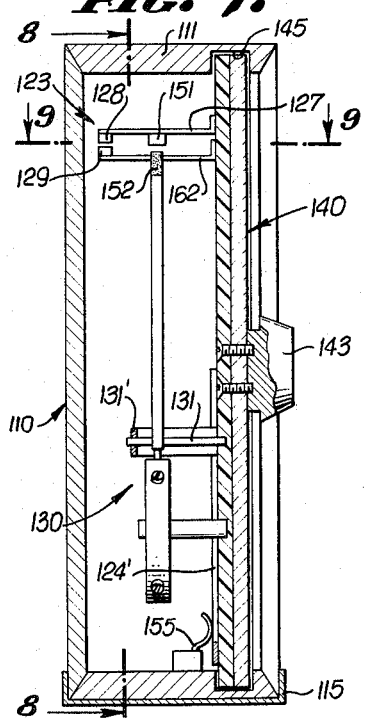
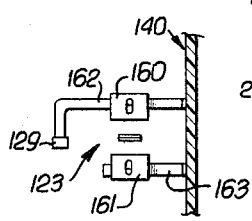
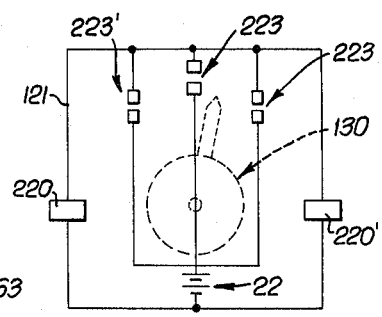
INVENTOR.
GILBERT WRIGHT
BY Miketta & Glenny
ATTORNEYS.

United States Patent Office 3,233,235
Patented Feb. 1, 1966

3,233,235
SIGNALING LEVEL
Gilbert Wright, 21642 Rambla Vista, Malibu, Calif.
Filed Aug. 16, 1963, Ser. No. 302,501
8 Claims. (Cl. 340—282)

This invention relates to levels and leveling devices employed to measure the inclination of surfaces and to produce desired angles of repose for adjustable surfaces. More particularly, this invention relates to such levels and leveling devices which are capable of producing a distantly perceivable signal or alarm actuated by the device upon its assumption of a preselectable angle of repose.

The most commonly employed form of level is the bubble level which is capable of directly measuring only zero and 90° angles of repose to the horizontal. In adjusting a structural member with such a level, two operators are often required in that one man may have to watch the bubble and give instructions to another man who is moving the member being leveled. It is the principal object of this invention to disclose and provide a level or leveling device which will produce a signal, audible, visual or other, when the device is disposed at a desired slope or angle such that a single operator can manipulate a member being leveled and be made aware of the proper leveling of such member by the signal even though he is in a remote position relative to the level or leveling device.

It is another object of the present invention to disclose and provide a highly sensitive means of measuring unknown slopes or angles in degrees or fractions of degrees, or other units of measurement.

It is a further object of the present invention to disclose and provide a leveling means for determining angles of repose for adjustable surfaces without the close visual observation necessary in the use of the common bubble level.

It is another object of the present invention to provide and disclose a highly sensitive level capable of producing a distantly perceivable signal when the level is disposed at a predetermined angle by the completion of electric circuit means operatively associated with signaling means in response to the free pivotal movement of a pendulum acting under the forces of gravity.

It is a still further object of the present invention to disclose and provide a highly sensitive level as in the preceding object wherein magnetically operating means are employed in association with the freely movable pendulum to close the circuit means to the signaling means when the level assumes a preselectable angle of repose.

It is a still further object of the present invention to provide and disclose means for rotatively mounting a freely pivoted pendulum associated by magnetic means with switch means for opening and closing an electrical circuit operatively associated with a signaling means for producing a distantly perceivable signal upon the vertical disposition of the pendulum.

Generally stated, the signaling level contemplated within the present invention comprises a body or level having a substantially flat surface adapted to be disposed upon the member or surface being leveled. A signaling means operable by electric current may be mounted on the body or level or at some location remote from the level with, in either event, electric current circuit means associated with the body and the signaling means for supplying electric current to the signaling means. The electric circuit means includes switch means for selectively opening and closing the circuit to operate the signal. A weighted pendulum is pivotally mounted to the level to swing freely under the forces of gravity. Magnetic means are associated with the aforementioned switch means in the pendulum for closing the switch without any interfering action or contact by the pendulum, but by magnetic force exerted between portions of the switch and the pendulum. As particularly contemplated within the present invention, a knife edged element is provided upon a spring arm of the switch means. A second knife edged element is disposed on an upper portion or stem of the pendulum, the two knife edged elements coming into alignment when the pendulum assumes a virtually vertical position. At least one of the two knife edged elements is magnetized, being either a permanent magnet or electro magnet, such that a magnetic force is exerted between the knife edged elements when in alignment. The switch means may be adapted to close the electric circuit means either upon a magnetic attraction between the knife edged elements or upon a repulsion of the elements. It is preferred that the switch close by magnetic attraction between the knife edged elements and that no physical contact occur between the knife edged elements. By closing an electrical contact through the use of magnetic forces between the switch and pendulum, the free movement of the pendulum in response to the force of gravity is maintained and the device is extremely sensitive to slight changes in angles of repose. It is further contemplated within the invention that means may be provided for localizing the magnetic field between the magnetic elements associated with the pendulum and switch means. Such means are employed to increase the sensitivity of the level.

Additional objects and various advantages of the signaling level in accordance with the present invention will become apparent to those skilled in the art from a consideration of the following detailed description of exemplary embodiments. Reference will be made to the appended sheets of drawings in which:

FIG. 1 is a perspective of an exemplary embodiment of the signaling level in accordance with the present invention;

FIG. 2 is a schematic representation of the pendulum, circuit means and switch means employed in the exemplary embodiment of signaling level of FIG. 1;

FIG. 3 is a section view of a portion of the signaling level of FIG. 1;

FIG. 4 is a schematic representation of an alternative form of pendulum, circuit means and switch means employable in the signaling level of FIG. 1, in accordance with the present invention;

FIG. 5 is an alternative exemplary embodiment of switch means employable in the signaling level of FIG. 1;

FIG. 6 is a perspective view of a further alternative exemplary embodiment of a signaling level in accordance with the present invention;

FIG. 7 is a cross-sectional view of the signaling level of FIG. 6;

FIG. 8 is a rear sectional view of the signaling device of FIG. 7 taken therein along the plane 8—8;

FIG. 9 is a detail view of a portion of the signaling level of FIG. 7 taken therein along the plane 9—9; and FIG. 10 is a schematic representation of an alternative exemplary embodiment of the electric means, switch means and the pendulum employable in the signaling levels of FIGS. 1 and 6.

Referring now to the drawings, particularly FIGS. 1 through 3, an exemplary embodiment of the signaling level according to the present invention will be described in detail. A body, indicated generally at 10, is provided with a rear casing member 11 and an angle iron member 12 fastened to casing 11 by fasteners or screws 13. The angle iron member 12 provides a forward face or wall 14 at right angles to the bottom face or wall 15. The bottom face or wall 15 is preferably provided with a flat or planar, and ideally a virtually flat, surface to lie upon the particular surface being leveled.

Signaling means are provided in association with the signaling level to signal when the level is disposed in a preselected position relative to the horizontal. The signaling means may be a flashing light, audible buzzer, or any other signaling device perceptible by the user from a distance. In the exemplary embodiment of FIGS. 1 through 3, the signaling means employed is a conventional flashing light, indicated generally at 20. The signaling means may be mounted on the signaling level, as on the front plate 14 in FIG. 1 or it may be mounted on a panel independent of the level and function remotely of the level. It is preferred that the particular signaling means employed be operable by electric current so that it may be operated by the level mechanisms subsequently described.

Electric current circuit means are associated with the body 10 and the signaling means for supplying electric current to the signaling means and operated in response to the disposition of the level. Such means may include lead lines adapted to interconnect the signaling means and a source of electric potential with switch means for selectably opening and closing the circuit means. In the present exemplary embodiment, such means are shown in FIG. 2, including the lead line 21 to interconnect a source of electric potential or battery 22 with a switch means, indicated generally at 23, for opening or closing the circuit, a lead line 24 interconnecting the switch 23 and the signaling means, indicated generally at 20, and a lead line 25 interconnecting the signaling means and the source of electric potential or battery 22. A manually operable on/off switch 26 may be inserted in the circuit means, as in lead line 21 in the embodiment of FIG. 2, to provide an easy means of inactivating the signaling level when not in use. The switch means, indicated generally at 23, for selectively opening and closing the circuit means includes a spring or switch arm 27 with a contact 28 adapted to abut contact 29 interconnected into the lead line 24. The switch, indicated generally at 23, shown is of the self-opening kind, but a self-closing switch can be employed.

A pendulum is pivotally mounted within the signaling level to respond to the force of gravity and assume vertical positions when unrestrained to indicate with a calculated dial, the inclination of the level or body 10 relative to the horizontal. In the first exemplary embodiment, the pendulum, indicated generally at 30 may be pivotally mounted on a post 31 and be provided with a weighted or mass portion 32 and an upwardly extending stem or end portion 33. The pendulum, indicated generally at 30, may be pivotally mounted within the body on the forward wall 14 or preferably, as hereinafter described, upon a rotatable angularly adjustable non-conductive dial, indicated generally at 40.

Mounting means for pivotally mounting the pendulum, indicated generally at 30, to the body, indicated generally at 10, are provided, which may comprise merely a mounting post, as post 31, secured to an inner surface of the forward wall or face 14 of the angle iron on the body. Preferably, and in accordance with the present invention, the mounting means for pivotally mounting the pendulum, indicated generally at 30, comprises an angularly adjustable electrically non-conductive dial, indicated generally at 40, rotatably mounted on the body 10 with an arbor or post 31 pivotally mounting the pendulum to the dial. As seen in FIG. 1, the dial, indicated generally at 40, may be calibrated in degrees as shown at 41, or any other suitable units of measurement, to be read relative to the pointer 42 and a manually operable knob 43. Dial mounting means may be associated with the housing or body 10 for mounting the dial to the body or housing 10 for rotation in a plane substantially perpendicular to that of the bottom surface of the leveling device provided by the bottom wall 15. In the exemplary embodiment of FIGS. 1 through 3, such dial mounting means may include a collar 44, as shown in FIG. 3, fixed to the forward face of the body on forward wall 14 with an internal channel or groove 45 receiving the periphery and marginal portions of the dial indicated generally at 40. As shown best in FIG. 3, the dial is recessed relative to the collar 44 so that the knob 43 will be protected from inadvertent handling or contact which might disturb a desired setting. A similar recessed portion may be provided in the rear of the housing or body casing 10 so that the signalling level may be more easily carried by grasping it by the opposed recesses.

Limit or stop means may be provided to limit the movement of the pendulum in order to assure its proper orientation for use and to protect it from damaging movements upon rough handling and impacts such as may be caused by dropping of the level. In the exemplary embodiment of FIGS. 1 through 3, such limit means may comprise a pair of rubber posts or stops 48 and 49.

Magnetic means are associated with the switch means and pendulum for closing the electric current circuit means by the exertion of magnetic forces between portions of the switch means and the pendulum. In accordance with the present invention, a thin magnetic element is disposed on a portion of the switch means and on an upper end of the pendulum. When the upper end of the pendulum in its pivoting movement, aligns its magnetic element with that on the switch means, magnetic attraction between the elements may be employed to close the electric circuit means associated with the signaling means. At least one of the magnetic elements is to be a magnet and preferably, a permanent magnet. In the exemplary embodiment of FIGS. 1 through 3, the switch means includes the resilient spring or switch arm 27 with its contact 28 adapted to engage the contact 29 to close the switch. A thin knife edged element of magnetic material 51, such as soft iron, is disposed preferably at a mid-portion of the spring or switch arm 27 with the knife edge facing the pendulum, indicated generally at 30. The portion of the switch arm 27 between the element 51 and the support for the arm where lead line 26 is connected should be resilient so that element 51 may be attracted to the magnet on the pendulum. The portion of the spring or switch arm 27 between the element 51 and the contact 28 may be relatively rigid so that upon attraction of element 51 to the magnet on the pendulum, a good contact between the contacts 28 and 29 may be effected. A magnet 52 having an upwardly directed knife edge is mounted on the upper end or stem of the pendulum to align with the magnetic material element 51 when the dial is set with its zero aligned with pointer 42 and the pendlulum has assumed a freely pivoted vertical position. Magnet 52 is preferably a permanent magnet though it is contemplated that an electro magnet magnetized by the completion of a circuit on closing of a manual switch 26 could be employed. Further, it is contemplated within the invention that the element 51 could be the magnet with the element 52 being merely of magnetic material or, both elements 51 and 52 could be magnets. Attraction of the elements 51 and 52 toward one another, without any actual physical contact, when aligned is adapted to close the switch means, indicated generally at 23, by engagement of the contacts 28 and 29. The disposition of the switch arm 27 and its contact 28 relative to contact 29 could be reversed and the elements 51 and 52 could be adapted to repel each other in order to cause a closing of the switch means by magnetic repulsion rather than by the attraction as employed in the exemplary embodiment. In either case, the magnetic means elements 51 and 52 do not contact each other in their operation to close the independent electric circuit means to the signaling means.

In operation, if it is desired to provide a surface in a horizontal plane, the dial, indicated generally at 40, may be rotated by knob 43 to bring the zero setting on the calibrated scale 41 in alignment with the pointer 42, as shown in FIG. 1. The signaling level may then be placed upon the surface being leveled with the bottom wall of flat surface 15 resting upon the surface to be leveled. When the latter surface is disposed in a perfectly level or horizontal plane relative to the axis 31 of the pendulum, the elements 51 and 52 will be aligned and the signaling means will be operated by a closing of the circuit means by the switch means indicated generally at 23. If on the other hand, the slope of a roof or other inclined surface is to be ascertained, the level may be rested upon such surface and the dial, indicated generally at 40, rotated until the signaling means is operated. The degree of inclination of the measured surface from the calibrated dial reading beneath the pointer 42.

Referring to FIG. 4, the connection between the signaling means, indicated generally at 20, and the contact 29 upon the rear surface of the rotating dial, indicated generally at 40, is more completely described. A circuit path 24' of electrically conductive material may be embedded in the rear surface of the dial, indicated generally at 40, with a sliding contact means 55 mounted on the body 10 to provide an electrical contact between the lead line 24 and the path 24'. Also, as shown in FIG. 4, the electric circuit means may be provided with a grounded lead line 21', the battery 22, lead 25 to the signaling means indicated generally at 20, lead 24, contact 55, circuit path 24', contacts 29 and 28 when switch 23 is closed and lead line 21' to ground.

Alternative limiting means are shown in FIG. 4 for limiting the movement of the pendulum 30 about its pivot post 31. As shown in the exemplary embodiment of FIG. 4, a stop post 48' may be disposed in a central opening 32' in the weighted portion 32 of the pendulum. A plurality of adjustable stops 49' may be disposed in the weighted portion 32 to engage the post 48' and thereby limit pivoting movement of the pendulum about its pivot 31.

An alternative exemplary embodiment of the magnetic means associated with the switch means and the pendulum for closing the circuit means is shown in FIG. 5. In this embodiment, a T-shaped element 53 of magnetic material is disposed upon two permanent magnets 54 and 54', as shown in FIG. 5. The knife edge 51' of the base of the T has the same polarity of the ends of the two aligned magnets 54 and 54' supporting the crossbar of the T. The element 52 on the pendulum indicated at 30 may be of magnetic material or be a magnet with a knife edge 56 of polarity opposite to that of knife edge 51'.

Referring now to FIGS. 6 to 10, an alternative exemplary embodiment of the signaling level according to the present invention will be described in detail. A body, indicated generally at 110, is provided a flat or planar bottom face for wall 115 to lie upon the particular surface being leveled. The signaling means associated with this alternative exemplary embodiment may be an audible buzzer, indicated generally at 120, mounted within the casing 111. Such signaling means is provided with electric current circuit means including the lead line 125 to interconnect the signaling means with a source of electric potential, as the batteries indicated generally at 122. A second lead line 124 interconnects the signaling means to the sliding contact means 155 with the circuit path 124' of electrically conductive material embedded in the rear surface of the dial, indicated generally at 140. Circuit path means 124' is connected by the lead line 121' to the switch means, indicated generally at 123. Such switch means includes the spring or switch arm 127 provided with a contact element 128 adapted to abut the contact 129, as best seen in FIG. 7. The contact 129 is grounded to the dial, indicated generally at 140.

The pendulum pivotally mounted within the signaling level of FIGS. 6 through 10, is indicated generally at 130. The pendulum is pivotally mounted on a post 131 which is fixedly mounted in the dial at one end and supported by the bracket 131' at the opposite end, as shown in FIG. 7. The mounting means for pivotally mounting the pendulum to the body includes the angularly adjustable electrically non-conductive dial, indicated generally at 140, and post 131 with its bracket 131'. As shown in FIG. 6, the front face of the dial may be calibrated in degrees or any other units of measurement to align with a pointer or marker 142. Dial mounting means may comprise the channel or recess 145, as seen in FIG. 7, provided in the casing 111 of the body 110. Also, limit or stop means to limit the movement of the pendulum to protect it from damaging movements upon rough handling may be employed, as in the exemplary embodiment of FIG. 4, including the stop post 148' and the plurality of adjustable stops or pins 149'.

Magnetic means are associated with the switch means and pendulum for closing the electric circuit means by the exertion of magnetic forces between portions of the switch means and the pendulum. As in the embodiment of FIGS. 1 through 3, a thin knife edged element of magnetic material 151, such as soft iron, is disposed preferably at a mid portion of the spring or switch arm 127 with the knife edge facing the pendulum, indicated generally at 130. A magnetic 152 having an upwardly directed knife edge is mounted on the upper end of stem portion of the pendulum to align the magnetic material element 151 when the dial is set with its zero reading aligned with the pointer 142, as best shown in FIGS. 6 and 8. Either of the elements 151 and 152 can be a magnet, preferably a permanent magnet, or both elements can be magnets as previously indicated with relation to the embodiment of FIGS. 1 through 3.

Additional means are provided in the embodiment of FIGS. 6 through 9 for localizing the magnetic field created between the switch and pendulum by the magnetic means including the elements 151 and 152. As best seen in FIGS. 8 and 9, a pair of opposed blocks 160 and 161. These blocks may be of soft iron or any magnetic material and are preferably disposed on either side of the knife edged element 151 mounted on the spring arm 127. Leaf arms 162 and 163 may be provided, as best seen in FIG. 9, to support the elements 160 and 161 on either side of the element 151. The elements or blocks 160 and 161 are shown mounted on the arms 162 and 163, respectively, by pin and slot connections so that they are laterally adjustable relative to the magnetic means elements 151 and 152. The function of these blocks or elements 160 and 161 is to localize or channel the magnetic flux which flows between the magnetic means elements 151 and 152 and thereby increase the sensitivity of the level.

A further alternative embodiment of the signaling level is shown schematically in FIG. 10. It is contemplated that a signaling level of the present invention can be adapted to operate two signaling devices wherein a first signaling means 220 is actuated when the pendulum is to the left of a center or vertical position and a second signaling means 220' is actuated when the pendulum is to the right of center or vertical position. Both signals may be adapted to sound or flash when the pendulum assumes its vertical position. Such alternative exemplary embodiment, as shown in FIG. 10, comprises three circuit means interconnecting a source of electric potential 222 with the signaling means 220 and 220'. A first switch means, indicated generally at 223, corresponding to switch 23 or 123 of the prior embodiments, is connected by the lead line 121 to both signaling devices 220 and 220'. Thus, when the pendulum, indicated generally at 130, is in a vertical position relative to the first switch means 223, both signaling devices will operate. A second switch means 223', constructed in accordance with the aforedescribed switch means 23 and 123, may be provided on the back of the dial to the left of the first switch means, indicated generally at 223, so that when the pendulum swings to the left out of alignment with the first switch means, only the first signal 220 will be activated. If it is desired that the signal 220 be activated as the pendulum moves through a substantial arc to the left of the first switch means, an arcuately shaped element can be positioned on the switch arm in place of the knife edged element 151 of the aforedescribed embodiments. A third switch means, indicated generally at 223″, may be provided on the rear of the dial and to the right of the first switch means 223. Again, either a knife edged element or an arcuately extending element may be employed as a substitute for the corresponding element 151 of the switch means indicated generally at 23 and 123 of the prior embodiments.

Having thus described exemplary embodiments of the signaling level in accordance with the present invention, it should be understood that the embodiments described in detail herein are exemplary in character and are not meant to limit the scope of the invention which is defined by the following claims.

I claim:

1. A signaling level comprising:
    a body having a substantially flat surface;
    signaling means operable by electric current;
    electric current circuit means associated with said body and said signaling means for supplying electric current to said signaling means, said electric current circuit means including switch means for selectably opening and closing said circuit means;
    a weighted pendulum;
    mounting means for pivotally mounting said pendulum to said body; and
    magnet means including at least one knife edged magnet associated with said switch means and said pendulum for closing said switch and circuit means by magnetic force exerted between portions of said switch and said pendulum.

2. A signaling level as in claim 1 wherein additional magnet means are provided for directing the magnetic field created between said switch and pendulum by said magnet means.

3. A signaling level comprising:
    a body having a planar surface;
    a pendulum pivotally mounted to said body;
    a resilient non-magnetic spring arm mounted to said body above said pendulum;
    a knife edged element of magnetic material mounted on said spring element;
    a permanent magnet provided on an upper end of said pendulum and having an upwardly facing thin edge opposing said spring arm, said magnet attracting said spring arm toward said pendulum when aligned with said knife edged element;
    signaling means associated with said body; and
    electrical circuit means independent of said pendulum associated with said signaling means and spring element to complete an electrical circuit to said signaling means upon the attraction of said spring element toward said magnet.

4. A signaling level as in claim 3 wherein:
    a rotatable, angularly adjustable disc is provided on said body; and
    mounting means are provided for mounting said pendulum on a rear face of said disc with said body, said disc and pendulum being rotatable angularly relative to said body to cause signaling by said signaling means at selectable angles to the horizontal.

5. A signaling level as in claim 4 wherein a pair of spaced opposed magnetic elements are provided on said rear face of said disc, one of said pair on each side of said knife edged element of magnetic material, to localize a magnetic field established between said knife edged element and said permanent magnet.

6. A signal level as in claim 4 wherein said resilient non-magnetic spring arm is mounted on said rear surface of said disc.

7. A signaling level comprising:
    a housing having a substantially planar bottom surface;
    a calibrated dial;
    dial mounting means associated with said housing for mounting said dial to rotate in a plane substantially perpendicular to said bottom surface;
    a pendulum pivotally mounted on a rear surface of said dial within said housing;
    signaling means associated with said housing;
    electrical circuit means associated with said signaling means;
    electrical switch means in said circuit means for interrupting current from said source to said signaling means, said switch means including a spring element for closing said switch;
    a thin knife edged element of magnetic material disposed on said spring element;
    a magnet having an upwardly directed knife edge mounted on the upper end of said pendulum;
    means pivotally mounting said pendulum on said dial with said magnet closely spaced from said thin knife edged element when said pendulum is perpendicular to said spring,
    said switch being closed by movement of said pendulum mounted magnet into alignment with said knife edged spring element.

8. A signaling level comprising:
    a body having a substantially flat surface;
    signaling means operable by electric current;
    electric current circuit means associated with said body and said signaling means for supplying electric current to said signaling means, said electric current circuit means including switch means having a resilient non-magnetic switch arm means operable for selectively opening and closing said circuit means;
    a weighted pendulum;
    mounting means for pivotally mounting said pendulum to said body; and
    magnet means associated with said switch means and said pendulum for closing said switch and circuit means by magnetic force exerted between portions of said switch and said pendulum, said magnet means including a first element on said switch arm and including a knife edge portion facing said pendulum, and a second element on said pendulum having a knife edge portion facing said switch means, at least one of said first and second elements being a permanent magnet.

References Cited by the Examiner

UNITED STATES PATENTS

| | | | |
|---|---|---|---|
| 370,013 | 9/1887 | Fuller | 33—218 |
| 723,526 | 3/1903 | Hein | 340—266 |
| 1,058,320 | 4/1913 | Mitchell | 340—266 |
| 2,600,363 | 6/1952 | Morris | 340—282 |
| 2,611,189 | 9/1952 | Bello | 33—218 |
| 3,056,865 | 10/1962 | Reardon | 340—266 |

FOREIGN PATENTS 416,057   3/1919   France.

NEIL C. READ, *Primary Examiner.*